(12) United States Patent
Law

(10) Patent No.: US 6,406,741 B1
(45) Date of Patent: Jun. 18, 2002

(54) METHOD OF MAKING A POLYIMIDE LAYER CONTAINING FLUORINATED CARBON MATERIAL

(75) Inventor: Kock-Yee Law, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/722,511

(22) Filed: Nov. 28, 2000

(51) Int. Cl.$^7$ .............. B05D 5/12; C08J 3/00; C08K 3/00; B29C 47/12; B32B 27/00
(52) U.S. Cl. .......... 427/58; 524/424; 524/495; 528/503; 264/177.19; 428/473.5
(58) Field of Search .............. 524/495, 424; 528/503; 264/177.19; 427/58; 428/473.5

(56) References Cited

U.S. PATENT DOCUMENTS

| | | |
|---|---|---|
| 2,786,874 A | 3/1957 | Teeters et al. |
| 3,872,032 A | 3/1975 | Kanemaru et al. |
| 3,925,263 A | 12/1975 | Ukaji et al. |
| 3,925,492 A | 12/1975 | Ukaji et al. |
| 3,959,573 A | 5/1976 | Eddy et al. |
| 3,959,574 A | 5/1976 | Seanor et al. |
| 4,247,608 A | 1/1981 | Watanabe et al. |
| 4,524,119 A | 6/1985 | Luly et al. |
| 5,000,875 A | 3/1991 | Kolouch |
| 5,037,587 A | 8/1991 | Saruwatari et al. |
| 5,112,708 A | 5/1992 | Okunuki et al. |
| 5,259,989 A | 11/1993 | Schlueter, Jr. et al. |
| 5,259,990 A | 11/1993 | Schlueter, Jr. et al. |
| 5,286,566 A | 2/1994 | Schlueter, Jr. et al. |
| 5,286,570 A | 2/1994 | Schlueter, Jr. et al. |
| 5,397,863 A | 3/1995 | Afzali-Ardakani et al. |
| 5,409,557 A | 4/1995 | Mammino et al. |
| 5,487,707 A | 1/1996 | Sharf et al. |
| 5,514,436 A | 5/1996 | Schlueter, Jr. et al. |
| 5,556,899 A | 9/1996 | Afzali-Ardakani et al. |
| 5,571,852 A | 11/1996 | Afzali-Ardakani et al. |
| 5,591,285 A | 1/1997 | Afzali-Ardakani et al. |
| 6,066,400 A | 5/2000 | Law et al. |

FOREIGN PATENT DOCUMENTS

| | | | |
|---|---|---|---|
| EP | 0299785 | * | 1/1989 |
| EP | 0899615 | * | 3/1999 |

* cited by examiner

Primary Examiner—Tae H. Yoon
(74) Attorney, Agent, or Firm—Oliff & Berridge, PLC

(57) ABSTRACT

A method of making a polyimide layer containing fluorinated carbon therein includes subjecting a layer comprised of a polyimide precursor material and the fluorinated carbon to a first heating at a temperature less than about 400° C. for at least about 1 minute, and thereafter subjecting the layer to a second heating at a temperature greater than about 400° C. for at least about 1 minute, whereby the polyimide precursor is imidized to a polyimide. The polyimide layer finds particular utility as a substrate of a transfer member or a transfix member of an electrostatographic imaging device.

21 Claims, 2 Drawing Sheets

METHOD OF MAKING A POLYIMIDE LAYER CONTAINING FLUORINATED CARBON MATERIAL

BACKGROUND OF THE INVENTION

1. Field of the Invention

The present invention relates to a method of making biasable system layers or films for use in an electrostatographic, including digital, apparatus. More in particular, the present invention relates to a method of making a polyimide layer containing fluorinated carbon materials, which layer finds particular utility as a substrate of an intermediate transfer or transfix member of an electrostatographic device.

2. Discussion of Background Art

Generally, the process of electrostatographic copying is initiated by exposing a light image of an original document onto a substantially uniformly charged photoreceptive member. Exposing the charged photoreceptive member to a light image discharges a photoconductive surface thereon in areas corresponding to non-image areas in the original document while maintaining the charge in image areas, thereby creating an electrostatic latent image of the original document on the photoreceptive member. This latent image is subsequently developed into a visible image by depositing charged developing material such as toner onto the photoreceptive member such that the developing material is attracted to the charged image areas on the photoconductive surface.

A dry developer mixture usually comprises carrier granules having toner particles adhering triboelectrically thereto. Toner particles are attracted from the carrier granules to the latent image forming a toner powder image thereon. Alternatively, a liquid developer material may be employed. The liquid developer material includes a liquid carrier having toner particles dispersed therein. Generally, the toner is made up of resin and a suitable colorant such as a dye or pigment. Conventional charge director compounds may also be present. The liquid developer material is advanced into contact with the electrostatic latent image and the toner particles are deposited thereon in image configuration.

The developed toner image recorded on the imaging member is then transferred either directly to an image receiving substrate such as paper or first to an intermediate transfer member and then to an image receiving substrate. When a liquid developer material is employed, it is most advantageous to utilize an intermediate transfer member in order to avoid transferring any liquid carrier to an image receiving substrate. In other words, it is advantageous to transfer the developed image to a coated intermediate transfer web, belt or component, and subsequently transfer with very high transfer efficiency the developed image from the intermediate transfer component to a permanent substrate.

The toner particles may be transferred by heat and/or pressure to an intermediate transfer member, or more commonly, the toner particles may be electrostatically transferred to the intermediate transfer member by means of an electrical potential between the imaging member and the intermediate transfer member. After the toner has been transferred to the intermediate transfer member, it is then transferred to the image receiving substrate, for example by contacting the substrate with the toner image on the intermediate transfer member under heat and/or pressure. The intermediate transfer member may also be used as a transfix member, i.e., as also participating in the fusing of the image to the image receiving substrate.

Intermediate transfer members enable high throughput at modest process speeds. In four-color photocopier systems, the intermediate transfer member also improves registration of the final color toner image. In such systems, the four component colors of cyan, yellow, magenta and black may be synchronously developed onto one or more imaging members and transferred in registration onto an intermediate transfer member at a transfer station.

In a final step in the process, the photoconductive surface of the photoreceptive member is cleaned to remove any residual developing material that may be remaining on the surface thereof in preparation for successive imaging cycles.

In electrostatographic printing machines wherein the toner image is electrostatically transferred by a potential between the imaging member and the intermediate transfer member, the transfer of the toner particles to the intermediate transfer member and the retention thereof should be as complete as possible so that the image ultimately transferred to the image receiving substrate will have a high resolution. Substantially 100% toner transfer occurs when most or all of the toner particles comprising the image are transferred and little residual toner remains on the surface from which the image was transferred. Substantially 100% toner transfer is especially important for generating full color images since undesirable shifting or color deterioration in the final colors can occur when the primary color images are not accurately and efficiently transferred to and from the intermediate transfer members.

To increase toner transfer, the resistivity of the intermediate transfer member should be within a desired range, and preferably, wherein the resistivity is virtually unaffected by changes in humidity, temperature, bias field, and operating time. The desired resistivity range of operation varies for different types of electrostatographic printing devices, and thus it is highly desirable to have a transfer member that is comprised of material which is readily tunable in terms of conductivity/resistivity.

Bias members require a resistivity of the entire charging member within a desired range. Specifically, materials with too low resistivities will cause shorting and/or unacceptably high current flow to the photoconductor. Materials with too high resistivities will require unacceptably high voltages. Other problems that can result if the resistivity is not within the required range include low charging potential and non-uniform charging, which can result in poor image quality.

Therefore, it is important in biasable members that the resistivity be tailored to a desired range and that the resistivity remain within this desired range. Accordingly, it is desirable that the resistivity be unaffected or virtually unaffected to changes in temperature, relative humidity, running time, etc.

Attempts at controlling the resistivity of intermediate transfer members have been accomplished by, for example, adding conductive fillers such as ionic additives and/or carbon black to the conformable layer.

U.S. Pat. Nos. 3,959,573 and 3,959,574 describe adding additives such as a quaternary ammonium compound to hydrophobic and hydrophilic elastomeric polyurethane layers, respectively, in order to control the changes in resistivity due to changes in relative humidity. Similarly, U.S. Pat. Nos. 5,286,570, 5,259,990, 5,286,566 and 5,259,989 all describe the addition of an asymmetric ionic quaternary ammonium salt to a polyurethane elastomer to extend the useful electrical life of the polyurethane elastomers.

U.S. Pat. No. 5,112,708 discloses a charging member comprising a surface layer formed of N-alkoxymethylated nylon which may be filled with fluorinated carbon. U.S. Pat. No. 5,000,875 discloses tetrafluoroethylene copolymer compositions containing conductive carbon black or graphite fibers to increase conductivity when the tetrafluoroethylene copolymer has been treated with a fluorinating agent.

U.S. Pat. No. 5,397,863 discloses film capacitors using polyimide materials and fluorinated carbons. U.S. Pat. No. 5,556,899 discloses adding fluorinated carbon to polyimide materials to effect a change in the dielectric constant and the coefficient of thermal expansion of the polyimide for use in electronic packaging. U.S. Pat. No. 5,571,852 discloses use of fluorinated carbon in polyimide materials for electrical conductor patterns. U.S. Pat. No. 5,591,285 discloses adding fluorinated carbon to fluoropolymers and exposing the material to ultraviolet radiation for electronic packaging applications.

U.S. Pat. No. 6,066,400 describes a biasable member having a fluorinated carbon filled polyimide layer which exhibits controlled electrical conductivity, along with embodiments wherein the fluorinated carbon filled polyimide layer is a substrate, embodiments wherein the fluorinated carbon filled polyimide is a substrate having thereon a filled fluoropolymer outer layer, and embodiments wherein the fluorinated carbon filled polyimide layer is a substrate having thereon an intermediate metal layer, and an outer polymer layer.

In the manufacturing process of making such filled polyimide layers, a dispersion of the filler and the prepolymer solution is coated or extruded to form a coated film. The film is then dried, followed by a curing step to imidize the prepolymer to form the polyimide polymer. The process must be conducted at lower temperatures, for example 320° C. or below in order to avoid decomposition of the fluorinated carbon materials, which tend to have fairly low thermal stabilities. For example, ACCUFLUOR 2028, a material formerly manufactured by AlliedSignal, starts decomposing at around 320° C. One of the decomposition products of these fluorinated carbon materials may be $F_2$. Since $F_2$ is corrosive, manufacturing relaxable substrates using ACCUFLUOR 2028 and like materials is considered unsafe at higher temperatures. As a result of the need to use lower temperatures to imidize or cure the film layer, the imidization may not be as complete as at higher temperatures, and this may result in property differences in the layer, particularly with respect to the mechanical properties.

A need thus remains for an improved process of making fluorinated carbon filled films/layers that may be used as, for example, substrates of an intermediate transfer of transfix member.

SUMMARY OF THE INVENTION

It is thus one object of the present invention to develop a novel method of making a polyimide layer containing fluorinated carbon materials that permits imidization of the layer with reduced risk of release of $F_2$.

It is a further object of the present invention to develop an improved polyimide layer containing fluorinated carbon materials that has a readily tunable resistivity so as to be suitable for use as a transfer or transfix member substrate.

These and other objects are achieved by the present invention.

In one embodiment, the present invention relates to a method of making a polyimide layer containing fluorinated carbon materials therein, comprising subjecting a layer comprised of a polyimide precursor material and the fluorinated carbon materials to heating at a temperature less than about 400° C. for at least about 1 minute, and thereafter subjecting the layer to further heating at a temperature greater than about 400° C. for at least about 1 minute, whereby the polyimide precursor is imidized to a polyimide.

In a further embodiment, the invention relates to a method of making a transfer member or transfix member, comprising forming a substrate by subjecting a layer comprised of a polyimide precursor material and fluorinated carbon materials to heating at a temperature less than about 400° C. for at least about 1 minute and thereafter subjecting the layer to further heating at a temperature greater than about 400° C. for at least about 1 minute, whereby the polyimide precursor is imidized to a polyimide to form the substrate, and applying a surface coating to the substrate. In a further embodiment, the invention relates to a polyimide layer containing fluorinated carbon materials therein, most preferably made by the above-described method, wherein the fluorinated carbon materials have a thermal decomposition starting temperature of at least about 400° C. In a still further embodiment, the polyimide layer is a substrate of a transfer or transfix member.

DETAILED DESCRIPTION OF PREFERRED EMBODIMENTS

The present invention provides a biasable layer or film comprising a fluorinated carbon filled polyimide layer, wherein the layer is electrically conductive. The present invention further includes an electrostatographic machine comprising a biasable member, preferably a transfer or transfix member, capable of receiving an electrical bias, wherein the biasable member comprises a fluorinated carbon filled polyimide layer and wherein the film is electrically conductive.

The biasable system layers/films may be useful as bias charging films, sheets, belts or the like, or bias transfer or transfix films, sheets, belts, or the like. The biasable system films comprise a polyimide layer filled with or containing conductive filler, preferably fluorinated carbon filler. The present invention provides biasable system films with superior electrical and mechanical properties, including controlled conductivity in a desired resistivity range, and increased mechanical strength, durometer, tensile strength, elongation and toughness. Further, in embodiments, the films also exhibit excellent properties such as statistical insensitivity of conductivity to changes in temperature and humidity, intense continuous corona exposure, corrosive environments, solvent treatment, running time or cycling to high electric fields and back. Also, in embodiments, the layers permit a decrease in contamination of other xerographic components such as photoconductors.

The present invention relates to biasable members, and in preferred embodiments biasable transfer or transfix members, comprising a filled polyimide layer, preferably a fluorinated carbon filled polyimide layer, as a substrate.

Figure 1:
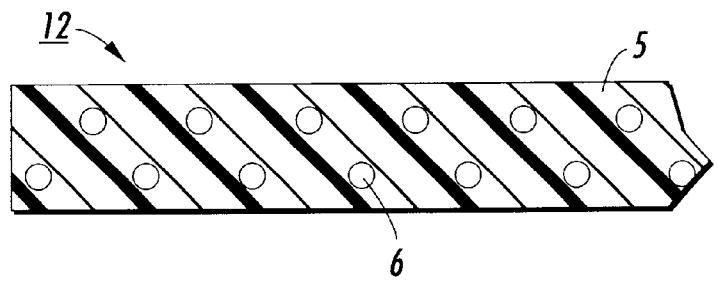
FIG. 1 is a sectional view of an embodiment of the present invention, with a biasable film comprising a fluorinated carbon filled substrate.

FIG. 1 is a sectional view of an embodiment of the present invention, wherein a biasable member 12 is in the form of a belt, sheet or film comprised of a polyimide 5 filled with fluorinated carbon filler 6 is depicted. There may be one or more layers of the fluorinated carbon filled polyimide.

Tuning the bias member to the desired resistivity is important in imparting the desired function to the polyimide layer containing fluorinated carbon materials. The resistivity can be selected not only by using the appropriate curing agents, curing time and curing temperature as set forth herein, but also by selecting a specific fluorinated carbon, or mixtures of various types of fluorinated carbon and selecting the specific fluorinated carbon loading. The percentage of fluorine in the fluorinated carbon will also affect the resistivity of the polymer when mixed therewith.

It is preferable that fluorinated carbon be dispersed in the polyimide layer. Fluorinated carbon, sometimes referred to as graphite fluoride or carbon fluoride, is a solid material resulting from the fluorination of carbon with elemental fluorine. The number of fluorine atoms per carbon atom may vary depending on the fluorination conditions. The variable fluorine atom to carbon atom stoichiometry of fluorinated carbon permits systematic, uniform variation of its electrical resistivity properties.

Fluorinated carbon refers to a specific class of compositions which is prepared by reacting fluorine to one or more of the many forms of solid carbon. In addition, the amount of fluorine can be varied in order to produce a specific, desired resistivity. Fluorocarbons are either aliphatic or aromatic organic compounds wherein one or more fluorine atoms have been attached to one or more carbon atoms to form well-defined compounds with a single sharp melting point or boiling point. Fluoropolymers are linked-up single identical molecules that comprise long chains bound together by covalent bonds. Moreover, fluoroelastomers are a specific type of fluoropolymer. Thus, despite some possible confusion in the art, it is apparent that fluorinated carbon is neither a fluorocarbon nor a fluoropolymer and the term is used in this context herein.

The fluorinated carbon may include the fluorinated carbon materials as described herein. The methods for preparation of fluorinated carbon are well known and documented in the literature; such as in U.S. Pat. Nos. 2,786,874, 3,925,492, 3,925,263, 3,872,032 and 4,247,608, the entire disclosures each of which are incorporated by reference herein. Essentially, fluorinated carbon is produced by heating a carbon source such as amorphous carbon, coke, charcoal, carbon black or graphite with elemental fluorine at elevated temperatures, such as 150° C. to 600° C. A diluent such as nitrogen is preferably admixed with the fluorine. The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke. One form of fluorinated carbon which is suitable for use in accordance with the invention is polycarbon monofluoride which is usually written in the shorthand manner $CF_x$, with x representing the number of fluorine atoms and generally being up to about 1.5, preferably from about 0.01 to about 1.5, and particularly preferred from about 0.04 to about 1.4. The formula $CF_x$ has a lamellar structure composed of layers of fused six carbon rings with fluorine atoms attached to the carbons and lying above and below the plane of the carbon atoms. Preparation of $CF_x$, type fluorinated carbon is described, for example, in above-mentioned U.S. Pat. Nos. 2,786,874 and 3,925,492, the disclosures of which are incorporated by reference herein in their entirety. Generally, formation of this type of fluorinated carbon involves reacting elemental carbon with $F_2$ catalytically. This type of fluorinated carbon can be obtained commercially from many vendors, including Central Glass International, Inc., White Plains, N.Y.; Diakin Industries, Inc., New York, N.Y.; and Advance Research Chemicals, Inc., Catoosa, Okla.

Another form of fluorinated carbon which is suitable for use in accordance with the invention is poly(dicarbon monofluoride) which is usually written in the shorthand manner $(C_2F)_n$. The preparation of $(C_2F)_n$ type fluorinated carbon is described, for example, in above-mentioned U.S. Pat. No. 4,247,608, the disclosure of which is herein incorporated by reference in its entirety.

In addition, preferred fluorinated carbons selected include those described in U.S. Pat. No. 4,524,119, the subject matter of which is hereby incorporated by reference in its entirety, and those having the tradename ACCUFLUOR (ACCUFLUOR is a registered trademark of AlliedSignal, Morristown, N.J.) for example, ACCUFLUOR 2028, ACCUFLUOR 2065, ACCUFLUOR 1000, and ACCUFLUOR 2010. ACCUFLUOR 2028 has 28 percent by weight fluorine, based on the weight of fluorinated carbon. ACCUFLUOR 2065 has 65 percent by weight fluorine based on the weight of fluorinated carbon. ACCUFLUOR 2065 and 2028 each comprise conductive carbon black. These fluorinated carbons are of the formula $CF_x$ and are formed by the reaction of $C+F_2=CF_x$.

The thermal stability of fluorinated carbon increases as the fluorination of the carbon increases. For example, ACCUFLUOR 2028 starts to decompose at only 320° C., while ACCUFLUOR 2065 starts to decompose above 400° C., as determined by TGA analysis.

The fluorine content of the fluorinated carbon can be varied to permit systematic uniform variation of the resistivity properties of the polyimide layer. The preferred fluorine content in the present invention is most preferably such that the fluorinated carbon does not start to decompose until a temperature of at least about 400° C., i.e., the fluorinated carbon has a thermal decomposition starting temperature of at least about 400° C., for example as determined by TGA analysis. In this regard, the fluorinated carbon preferably has a fluorine content of at least about 60 weight percent, preferably of at least about 65 percent.

The median particle size (diameter) of the fluorinated carbon can be less than about 1 micron and up to about 10 microns, and is preferably from about 0.001 to about 2 microns.

The amount of fluorinated carbon in the polyimide layer is preferably an amount to provide a surface resistivity of from about $10^2$ to about $10^{14}$ ohm/cm. For a biasable transfer or transfix member, the desired surface resistivity is from about $10^7$ to about $10^{14}$ ohm/sq, and preferably from about $10^8$ to about $10^{12}$ ohm/sq; and the desired bulk resistivity is from about $10^5$ to about $10^{12}$ ohm-cm and preferably from about $10^7$ to about $10^{10}$ ohm-cm.

Preferably, the amount of fluorinated carbon is from about 1 to about 50 percent by weight, preferably from about 3 to about 30 weight percent, of the layer, based on the weight of total solids. Total solids as used herein refers to the amount of polyimide, additives, any other fillers, and any other solid materials.

It is possible to mix different fluorinated carbons to tune the mechanical and electrical properties. Mixtures of different kinds of fluorinated carbon may achieve good resistivity, while achieving good mechanical and surface properties.

As the polyimide, a polyimide having a suitable high tensile modulus, and preferably, one that is capable of becoming a conductive film upon the addition of electrically conductive particles, is most preferred. The polyimide must be capable of exhibiting high mechanical strength, be flexible, and be resistive. A polyimide having a high tensile modulus is preferred because the high tensile modulus optimizes the film stretch registration.

Specific examples of suitable polyimides useful in the fluorinated carbon filled polyimide layer include PAI (polyamideimide), PI (polyimide), polyaramide, polyphthalamide, fluorinated polyimides, polyimidesulfone, polyimide ether, and the like. Specific examples are set forth in U.S. Pat. No. 5,037,587, the disclosure of which is herein incorporated by reference in its entirety.

The polyimides may be synthesized by prepolymer solutions such as polyamic acid or esters of polyamic acid, or by the reaction of a dianhydride and a diamine.

Suitable dianhydrides include aromatic dianhydrides and aromatic tetracarboxylic acid dianhydrides such as, for example, 9,9-bis(trifluoromethyl) xanthene-2,3,6,7-tetracarboxylic acid dianhydride, 2,2-bis-(3,4-dicarboxyphenyl)-hexafluoropropane dianhydride, 2,2-bis ((3,4-dicarboxyphenoxy) phenyl)-hexafluoropropane dianhydride, 4,4'-bis(3,4-dicarboxy-2,5,6-trifluorophenoxy) octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy) phenyl)-ether dianhydride, di-(4-(3,4-dicarboxyphenoxy) phenyl)-sulfide dianhydride, di-(3,4-dicarboxyphenyl) methane dianhydride, di-(3,4-dicarboxyphenyl)-ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)-propane dianhydride, bis(3,4-dicarboxyphenyl) ether dianhydride, bis(2,3-dicarboxyphenyl) ether dianhydride, bis(3,4-dicarboxyphenyl) sulfone dianhydride, bis(2,3-dicarboxyphenyl) sulfone 2,2-bis(3,4-dicarboxyphenyl)1,1,1,3,3,3-hexafluoropropane dianhydride, 2,2-bis(3,4-dicarboxyphenyl)-1,1,1,3,3,3-hexachloropropane dianhydride, 1,1-bis(2,3 -dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid) dianhydre 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis-(4-phenyleneoxy-4-phthalic acid) dianhydride, hexafluoroisopropylidenebis-(4-phenyleneoxy-4-phthalic acid) dianhydride, and the like.

Exemplary diamines suitable for use in the preparation of the polyimide include aromatic diamines such as 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3,-bis-(gamma-aminopropyl)-tetramethyldisiloxane, 1,6-diaminohexane, 4,4'diaminodiphenylmethane, 3,3'-diaminodiphenylmethane, 1,3,-diaminobenzene, 4,4'diaminodiphenyl ether, 2,4'-diaminodiphenylether, 3,3'-diaminodiphenylether, 3,4'diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis {4-(3-aminophenoxy)-phenyl} sulfide, bis {4-(3-aminophenoxy)phenyl} sulfone, bis {4-(3-aminophenoxy) phenyl} ketone, 4,4'-bis(3-aminophenoxy)biphenyl, 2,2-bis {4-(3-aminophenoxy)phenyl}-propane, 2,2-bis {4-(3-aminophenoxy)phenyl}-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1 -di(p-aminophenyl)ethane, 2,2-di(p-aminophenyl)propane, and 2,2-di(p-aminophenyl)-1,1,1,3,3,3-hexafluoropropane.

The dianhydrides and diamines are preferably used in a weight ratio of dianhydride to diamine of from about 20:80 to about 80:20, and preferably about 50:50 weight ratio. The above aromatic dianhydride (preferably aromatic tetracarboxylic acid dianhydride) and diamine (preferably aromatic diamine) are used singly or as a mixture, respectively. The polyimide can be prepared from the dianhydride and diamine by known methods. For example, the dianhydride and the diamine can be suspended or dissolved in an organic solvent as a mixture or separately and can be reacted to form the polyamic acid, which is thermally or chemically dehydrated and the product is separated and purified.

The polyimide is present in the fluorinated carbon filled polyimide substrate in an amount of from about 50 to about 99 percent by weight of total solids, preferably from about 99 to about 60, and particularly preferred from about 95 to about 30 percent by weight of total solids. Total solids includes the total percentage by weight (equal to 100%) of polyimide, fluorinated carbon, any additional fillers and any additives in the layer.

In a preferred method of making the polyimide layer of the present invention, the fluorinated carbon material is added to a polyimide prepolymer, such as polyamic acid, in solution, and subsequently formed into a layer, sheet, film, or the like by any suitable technique. Processes used to coat the film are well known in the art and include spin casting, solution coating, extrusion, hot-mold, and other known methods.

A preferred procedure for generating the polyimide layer comprises preparing polyamic acid solutions (i.e., polymer precursor or prepolymer solutions) by reacting a diamine, such as oxydianiline, with a tetracarboxylic acid dianhydride, such as hydromellitic dianhydride or benzophenone tetracarboxylic acid dianhydride in a solvent, such as N-methylpyrrolidine (NMP) or N,N-dimethylacetamide in a dry inert atmosphere. The mixture may be stirred for up to about 8 hours or heated to reflux if required to form the polyamic acid solution. The solid content ranges from about 10 to about 20% by weight. The fluorinated carbon is then added. A paint shaker or roll mill can be used to aid in the dispersion process.

Following or during formation of the layer, the layer is cured to preferably fully imidize the precursor polymer. In the present invention, this is achieved in a two step curing process. In the first step of curing, the layer is heated to a temperature of less than about 400° C., preferably a temperature of from about 350° C. to up to about 400° C., for a period of at least 1 minute, preferably for at least about 5 minutes, more preferably at least about 20 minutes. This first step of curing partially imidizes the polyimide in an environment (temperature) where the fluorinated carbon materials are most preferably stable. This first step thus may be conducted without the need for any special processing equipment. The partial imidization may be up to, for example, about 99% imidization of the polyimide.

The heating in the first curing step may be applied during formulation of the layer or subsequent to formation of the layer. Most preferably, the first step is conducted during extrusion of the layer/film, i.e., the temperature of the extrusion is conducted at the temperatures described above for the first step of the curing process.

In the second curing step, the temperature of the curing is increased to a temperature of at least about 400° C., more preferably from about 400° C. to about 500° C., for a period of at least about 1 minute, preferably at least about 5 minutes. In this second step, the temperature is different from and higher than the temperature in the first step, and may be higher than the stability temperature of the fluorinated carbon materials. This second step is thus preferably conducted in a ventilated environment equipped to handle any possible emission of $F_2$ from the layer. The second curing step completes the imidization of the polyimide, preferably achieving a filly imidized polyimide. The second step of curing also serves the purpose of tuning the resistivity of the layer to the desired value, as the higher the temperature or longer the curing step, the resistivity realized is lower.

The polyimide/fluorinated carbon layers may take a form suitable for use as a substrate of a transfer or transfix member. Examples of suitable configurations include a sheet, a film, a web, a foil, a strip, a coil, a cylinder, a drum, an endless strip, a circular disc, a belt including an endless belt, an endless seamed flexible belt, an endless seamless flexible belt, an endless belt having a puzzle cut seam, and the like. It is preferred that the substrate be an endless seamed flexible belt or seamed flexible belt, which may or may not include puzzle cut seams. Examples of such belts are described in U.S. Pat. Nos. 5,487,707 and 5,514,436. A method for manufacturing reinforced seamless belts is set forth in U.S. Pat. No. 5,409,557, the disclosure of which is hereby incorporated by reference in its entirety.

When the filled polyimide layer is used as a substrate of a transfer or transfix member, the transfer or transfix member may be achieved by applying one or more coatings/layers upon the substrate. Example coatings/layers for use upon transfer and/or transfix substrates are well known in the art, and need not be described here. However, reference is made to U.S. Pat. No. 6,066,400, incorporated herein by reference in its entirety, for a description of coatings that may suitably be used upon the substrate of the present invention. The coating(s)/layer(s) is/are coated on the substrate in any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating, flow coating, and the like. If a metal layer is formed on another layer, the metal layer is preferably deposited by vacuum deposition technique. Any suitable adhesive or other suitable conductive layer(s) may be present between any of the layers in any of the embodiments disclosed.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, a photoreceptor is charged on its surface by means of a charger to which a voltage has been supplied from power supply. The photoreceptor is then imagewise exposed to light from an optical system or an image input apparatus, such as a laser and light emitting diode, to form an electrostatic latent image thereon. Generally, the electrostatic latent image is developed by bringing a developer mixture from a developer station into contact therewith. Development can be effected by use of a magnetic brush, powder cloud, or other known development process.

After the toner particles have been deposited on the photoconductive surface, in image configuration, they may be directly transferred to an image receiving substrate such as a copy sheet or, more preferably, the developed image can be transferred to an intermediate transfer or transfix member and subsequently transferred to a copy sheet.

Figure 2:
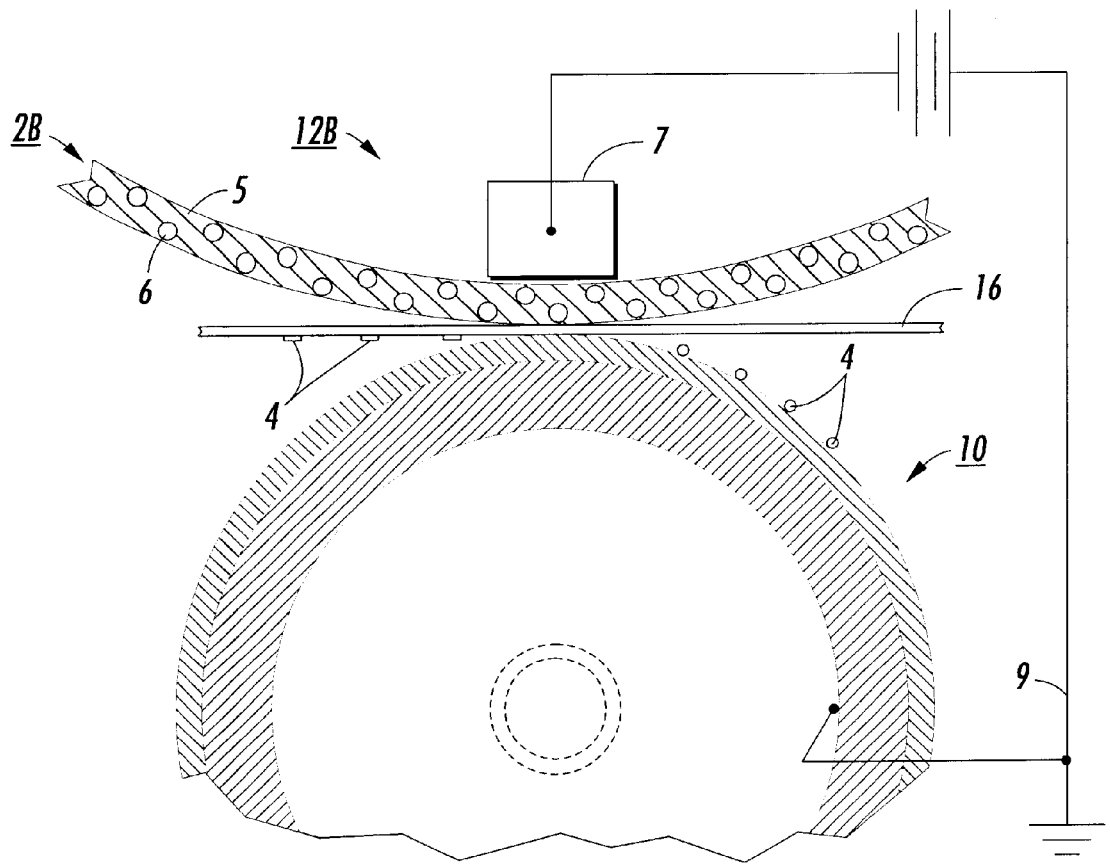
FIG. 2 is a schematic view of an image development system containing a bias transfer member.

FIG. 2 demonstrates an embodiment of the present transfer system including a bias transfer device 12B having a bias transfer belt 2B held in contact with an image carrier implemented as a photoconductive drum 10. The photoconductive member may be in the form of a belt or drum or other suitable photoconductive member. A DC voltage and optional AC current is applied from a power source 9 to the bias transfer belt 2B to cause it to charge the back side of the copy substrate 16 so as to attract toner 4 from photoreceptor 10 to copy substrate 16. The power is either directly supplied to bias transfer belt 2B or is supplied to bias transfer belt 2B via a bias supplying member 7. The bias transfer belt 2B has a conductive layer 5 such as polyimide, and has conductive particles 6 dispersed therein, such as, for example fluorinated carbon.

After the transfer of the developed image is completed, the copy sheet advances to a fusing station, which may comprise fusing and pressure rolls, wherein the developed image is fused to the copy sheet by passing the copy sheet between a fusing member and a pressure member, thereby forming a permanent image.

Figure 3:
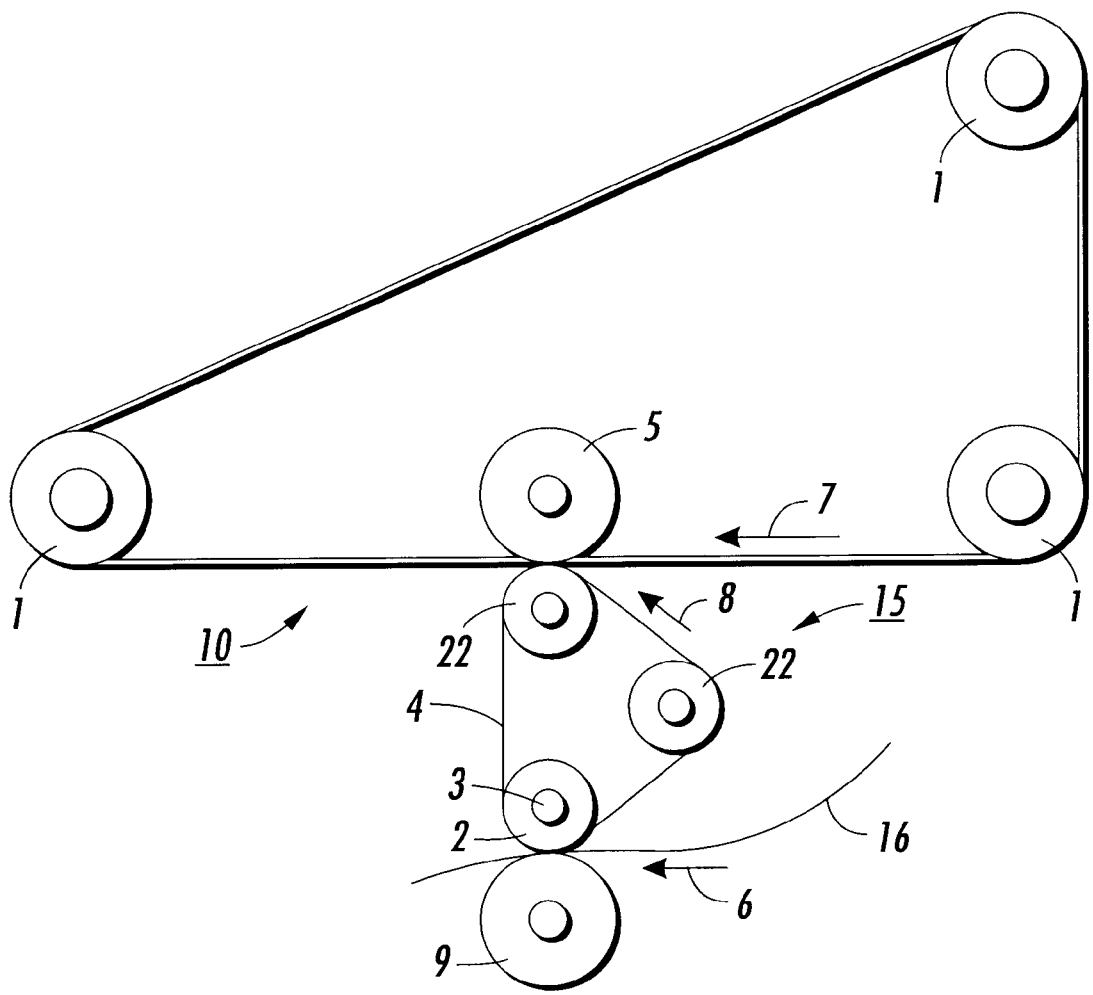
FIG. 3 is an illustration of an embodiment of the present invention, and represents a transfix or transfer member.

Transfer and fusing may occur simultaneously in a transfix configuration. As shown in FIG. 3, a transfer apparatus 15 is depicted as transfix belt member 4 being held in position by driver rollers 22 and heated roller 2. Heated roller 2 comprises a heater element 3. Transfix belt 4 is driven by driving rollers 22 in the direction of arrow 8. The developed image from photoreceptor 10 (which is driven in direction 7 by rollers 1) is transferred to transfix belt 4 when contact with photoreceptor 10 and belt 4 occurs. Pressure roller 5 aids in transfer of the developed image from photoreceptor 10 to transfix belt 4. The transferred image is subsequently transferred to copy substrate 16 and simultaneously fixed to copy substrate 16 by passing the copy substrate 16 between belt 4 (containing the developed image) and pressure roller 9. A nip is formed by heated roller 2 with heating element 3 contained therein and pressure roller 9. Copy substrate 16 passes through the nip formed by heated roller 2 and pressure roller 9, and simultaneous transfer and fusing of the developed image to the copy substrate 16 occurs.

The photoreceptor, subsequent to transfer, typically advances to a cleaning station, wherein any toner left on the photoreceptor is cleaned therefrom by use of a blade, brush, or other cleaning apparatus.

A bias can be supplied to the biasable member in various ways. A bias may be supplied to the biasable member through another biasable member such as a biasable supplying member capable of receiving a bias from an electrical bias source, wherein the electrical bias source is connected to the bias supplying member for directing or supplying electrical current thereto, and wherein the bias supplying member is capable of transferring or supplying the charge to the bias transfer or transfix member. The biasable supplying member may be in direct contact or in charging contact with said biasable transfer or transfix member so that the biasable member is capable of receiving and transferring or spraying the charge to a substrate, such as a copy substrate. In an alternative embodiment, the bias may be directly supplied to the bias transfer or transfix member.

EXAMPLE

A polyimide substrate consisting of 15% by weight of ACCUFLUOR 2065 is fabricated by curing the coated layer at 350° C. for about half an hour. The surface resistivity of the substrate is about $1 \times 10^9$ ohm/sq. When this layer is heated in an oven at 425° C. for another half an hour, the resistivity decreases to about $10^7$ ohm/sq.

As the conductivity of fluorinated carbon filled polymer layers is tunable through (a) filler concentration, (b) curing temperature, and (c) curing time, the invention achieves a tunable resistivity in the polyimide layer.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. A method of making a polyimide layer containing fluorinated carbon therein, comprising forming a layer comprised of a polyimide precursor material and the fluorinated carbon, subjecting the polyimide precursor material and the fluorinated carbon to a first heating at a temperature of from about 350° C. to up to about 400° C. for at least about 1 minute during or subsequent to formation of the layer, and thereafter subjecting the layer to a second heating at a temperature greater than about 400° C. for at least about 1 minute, whereby the polyimide precursor is imidized to a polyimide.

2. The method according to claim 1, wherein the first heating is conducted for at least about 5 minutes.

3. The method according to claim 1, wherein the first heating partially imidizes the polyimide precursor up to about 99% imidization.

4. The method according to claim 1, wherein the second heating is conducted at a temperature of about 400° C. to about 500° C., which temperature is different from and higher than the temperature in the first step.

5. The method according to claim 1, wherein the second heating achieves full imidization of the polyimide precursor.

6. The method according to claim 1, wherein the fluorinated carbon is present in an amount of from about 1 to about 30 percent by weight based on the weight of total solids of the layer.

7. The method according to claim 1, wherein the fluorinated carbon has a fluorine content of at least about 60 weight percent based on the weight of fluorinated carbon.

8. The method according to claim 1, wherein the fluorinated carbon has a thermal decomposition starting temperature of at least about 400° C.

9. The method according to claim 1, wherein the polyimide precursor is generated from the reaction product of a dianhydride with a diamine.

10. The method according to claim 1, wherein the polyimide precursor is a polyamic acid.

11. A method of making a biasable member of an electrostatographic imaging device, comprising forming a substrate by forming a layer comprised of a polyimide precursor material and a fluorinated carbon material, subjecting the polyimide precursor material and the fluorinated carbon material to heating at a temperature of from about 350° C. to up to about 400° C. for at least about 1 minute during or subsequent to formation of the layer and thereafter subjecting the layer to further heating at a temperature greater than about 400° C. for at least about 1 minute, whereby the polyimide precursor is imidized to a polyimide to form the substrate, and applying one or more surface coatings to the substrate.

12. The method according to claim 11, wherein the first heating is conducted during extrusion of the layer.

13. The method according to claim 11, wherein the first heating partially imidizes the polyimide precursor up to about 99% imidization.

14. The method according to claim 11, wherein the second heating is conducted at a temperature of about 400° C. to about 500° C., which temperature is different from and higher than the temperature in the first step.

15. The method according to claim 11, wherein the second heating achieves full imidization of the polyimide precursor.

16. The method according to claim 11, wherein the fluorinated carbon is present in an amount of from about 1 to about 30 percent by weight based on the weight of total solids of the layer.

17. The method according to claim 11, wherein the fluorinated carbon has a fluorine content of at least about 60 weight percent based on the weight of fluorinated carbon.

18. The method according to claim 11, wherein the fluorinated carbon has a thermal decomposition starting temperature of at least about 400° C.

19. The method according to claim 11, wherein the polyimide precursor is generated from the reaction product of a dianhydride with a diamine.

20. The method according to claim 11, wherein the polyimide precursor is a polyamic acid.

21. A method of making a polyimide layer containing fluorinated carbon therein, comprising forming a layer comprised of a polyimide precursor material and the fluorinated carbon by extrusion, subjecting the polyimide precursor material and the fluorinated carbon to a first heating at a temperature less than about 400° C. for at least about 1 minute during the extrusion, and thereafter subjecting the layer to a second heating at a temperature greater than about 400° C. for at least about 1 minute, whereby the polyimide precursor is imidized to a polyimide.

* * * * *